(12) United States Patent
Mandell et al.

(10) Patent No.: US 9,568,589 B1
(45) Date of Patent: Feb. 14, 2017

(54) SATELLITE BEAMFORMING AND CHANNELIZATION

(71) Applicant: RKF Engineering Solutions LLC, Washington, DC (US)

(72) Inventors: Michael Mandell, Farmington Hills, MI (US); Ted Kaplan, North Potomac, MD (US); Arnold Berman, Washington, DC (US); Jeffrey Freedman, Laurel, MD (US); Brian Sipos, Alexandria, VA (US); Scott Conrad Markely, Washington, DC (US); Erik Halvorson, Vienna, VA (US); David Marshack, Bethesda, MD (US)

(73) Assignee: RKF Engineering Solutions LLC, Washington, DC (US)

( * ) Notice: Subject to any disclaimer, the term of this patent is extended or adjusted under 35 U.S.C. 154(b) by 982 days.

(21) Appl. No.: 13/830,485

(22) Filed: Mar. 14, 2013

Related U.S. Application Data (60) Provisional application No. 61/697,170, filed on Sep. 5, 2012.

(51) Int. Cl.
*H04B 7/185* (2006.01)
*G01S 7/02* (2006.01)
*H01Q 3/26* (2006.01)

(52) U.S. Cl.
CPC ............ *G01S 7/023* (2013.01); *H01Q 3/2605* (2013.01); *H01Q 3/26* (2013.01); *H04B 7/18513* (2013.01); *H04B 7/18519* (2013.01)

(58) Field of Classification Search
CPC .... H01Q 3/26; H01Q 3/2605; H04B 7/18513; H04B 7/18519

USPC .................. 342/354, 368; 455/427
See application file for complete search history.

(56) References Cited

U.S. PATENT DOCUMENTS

| | | | | |
|---|---|---|---|---|
| 6,016,124 A | * | 1/2000 | Lo | H01Q 3/26 342/373 |
| 6,240,072 B1 | * | 5/2001 | Lo | H04B 7/2041 370/316 |
| 6,697,619 B1 | * | 2/2004 | Hogberg | H04B 7/2041 455/12.1 |
| 8,224,387 B2 | | 7/2012 | Bishop | |
| 9,209,891 B1 | * | 12/2015 | Mandell | H04B 7/1851 |

(Continued)

OTHER PUBLICATIONS

"Architecture, Implementation and Performance of Ground-Based Beam Forming in the DBSD G1 Mobile Satellite System"; Walker et al; American Institute of Aeronautics and Astronautics; 28th AIAA International Communications Satellite Systems Conference (ICSSC-2010); Aug. 30-Sep. 2, 2010, Anaheim, California.*

(Continued)

Primary Examiner — Jack W Keith
Assistant Examiner — Chuong P Nguyen
(74) Attorney, Agent, or Firm — Fish & Richardson P.C.

(57) ABSTRACT

In one implementation, receive signals may be received by a satellite using corresponding receive elements. The receive signals may form one or more receive beams at one or more receive frequency channels. Transmit signals may be calculated by the satellite by linearly combining the obtained receive signals using transform data. The calculated transmit signals may form one or more transmit beams at one or more transmit frequency channels. The calculated transmit signals may be transmitted by the satellite using corresponding transmit elements.

15 Claims, 6 Drawing Sheets

(56) References Cited

U.S. PATENT DOCUMENTS

2004/0110469 A1 6/2004 Judd
2008/0268775 A1* 10/2008 Bishop ................ H04B 7/0617
 455/13.3
2011/0205120 A1 8/2011 Culkin

OTHER PUBLICATIONS

"Beamforming for OFDM based Hybrid Terrestrial-Satellite Mobile System"; Ammar Hussain Khan; Centre for Communication System Research Faculty of Engineering and Physical Sciences; University of Surrey; Jan. 2011.*

* cited by examiner

$$C[rxB, rxch, txB, txch] = \begin{cases} 1, & \text{if } (rxB, rxch) \text{ connects to } (txB, txch) \\ 0, & \text{else.} \end{cases}$$

SATELLITE BEAMFORMING AND CHANNELIZATION

CROSS-REFERENCE TO RELATED APPLICATIONS

This application claims priority to U.S. Provisional Application No. 61/697,170 filed on Sep. 5, 2012 and titled "EFFICIENT SATELLITE BEAMFORMING AND CHANNELIZATION," which is incorporated herein by reference in its entirety.

TECHNICAL FIELD

The following disclosure deals with satellite beamforming and channelization.

BACKGROUND

Some satellite communications systems provide multiple beams that connect diverse terrestrial regions through a satellite. In this context, a satellite may use multiple antenna elements, which may also be referred to as feeds, in a phased array or as part of a reflector antenna, to form one or more communication beams for communicating with terrestrial devices in the coverage areas of the communication beams. A satellite communications system may combine an array of antenna elements or feeds coherently to create one or more discrete beam shapes that cover geographic areas.

BRIEF DESCRIPTION OF THE FIGURES

Like reference symbols in the various drawings indicate like elements.

DETAILED DESCRIPTION

A satellite may receive signals from and transmit signals to terrestrial devices. For example, the satellite may receive a signal from a gateway, e.g., a ground station that communicates with the satellite and with a terrestrial network, and may then broadcast the signal to one hundred user terminals, e.g., satellite dishes along with their associated computer systems in customer households. The satellite may use multiple antenna elements, in, for example, a phased array antenna or as part of a reflector antenna, to communicate with the terrestrial devices. An antenna element, which is also known as a feed, refers to a resonating structure that is designed to transmit or receive electromagnetic energy in a frequency band (e.g., a microwave frequency band).

Antenna elements configured to receive signals from terrestrial devices may be referred to as receive antenna elements. In response to the terrestrial devices signals, each of the receive antenna elements may produce its own signal, which may be referred to as a receive signal. Because multiple terrestrial devices may be simultaneously transmitting to the satellite, the terrestrial device signals may constructively or destructively interfere with each other. For example, a signal from a first gateway and a signal from a second gateway may be sensed by the satellite as a single signal that is an aggregate of the two signals from the gateways. To avoid interference, terrestrial devices may transmit signals over different frequency ranges. The different frequency ranges of the signals also may be referred to as frequency channels. For example, when the entire frequency range that the satellite is capable of handling corresponds to a bandwidth of 480 MHz, one gateway may transmit signals over a first half of the frequency range (corresponding to 240 MHz of bandwidth) while the other gateway may transmit signals over the second half of the frequency range (corresponding to the remaining 240 MHz of bandwidth).

However, in some circumstances the terrestrial devices may need to transmit signals over frequency channels that interfere. For example, the maximum number of frequency channels that the satellite is able to support may be insufficient to allow every terrestrial device to use a different frequency range. To distinguish terrestrial device signals received from different terrestrial devices over a same frequency channel, the satellite may use beamforming, a technique that leverages the fact that antenna elements, which are positioned in different orientations and locations on the satellite, sense signals from terrestrial devices located at different geographic locations on Earth differently. For example, an antenna element oriented and positioned on the satellite towards Los Angeles may sense signals from terrestrial devices in Los Angeles more strongly than an antenna element oriented at Washington DC or an antenna element oriented at Los Angeles but a few inches further from Los Angeles.

To isolate the individual co-channel terrestrial device signals from each other, the satellite may combine the different signals received by the antenna elements differently for each of the transmitting terrestrial devices. Specifically, each of the transmitting terrestrial devices may be associated with its own receive beam having an associated beam coverage area. A receive beam corresponds to a particular manner of combining the antenna element receive signals such that terrestrial device signals transmitted by terrestrial devices located within the geographic extent corresponding to the beam's coverage area are enhanced while, at the same time, terrestrial device signals received from outside of that geographic extent are suppressed. For example, if there are three gateways transmitting to the satellite using a same frequency channel, with a first of the gateways being in Los Angeles, a second being in Washington DC, and a third being Boston, the satellite may use three different receive beams to provide service to the three gateways. The first gateway may be associated with a first receive beam that covers only the Los Angeles area; the second gateway may be associated with a second receive beam that covers only the Washington DC area; and the third gateway may be associated with a third receive beam that covers only the Boston area.

The receive beams may be formed by linearly combining the receive signals according to receive beamforming coefficients. The receive beamforming coefficients may represent different weights that are applied to different receive signals to obtain different receive beams. For example, the weights may specify relative phase and/or gain adjustments for each pair of receive beam and receive signal by specifying a multiplier that is applied to the receive signal to obtain the receive beam. A particular receive beam may be formed by, for example, summing the products of the receive signals and the receive beamforming coefficients for that receive beam and the receive signals. As noted above, a particular receive beam may be formed to isolate a terrestrial device co-channel signal transmitted from a device located within the geographic extent of the beam from terrestrial device co-channel signals transmitted from devices outside of the geographic extent of the beam.

For example, in a satellite having only two receive elements, the receive beamforming coefficients may specify that for a first receive beam, the receive signal from a first antenna element is multiplied by 0.5 and added to the receive signal from a second antenna element that is multiplied by 0.3, and for a second receive beam, the receive signal from the first antenna element is multiplied by 0.4 and added to the receive signal from the second element that is multiplied by 0.75. While the coefficients in this simple example are shown here as only having real components that affect the relative gain of receive signals, the coefficients may also include imaginary components that affect the relative phase of receive signals.

To enable a terrestrial device to communicate a signal to one or more other terrestrial devices, the satellite may switch one or more receive beams to one or more transmit beams. Each of the transmit beams may be defined to have a beam coverage area that covers one of the other terrestrial devices. For example, if the satellite is transmitting to three gateways, three transmit beams may be defined, each having a beam coverage area that covers the location of a different one of the three gateways. In switching receive beams to transmit beams, the satellite may also switch frequency channels from one or more receive beams to one or more frequency channels of one or more transmit beams. The satellite may perform the switching by forming transmit beams through linearly combining the formed receive beams according to a connection matrix of "1"s and "0"s defining which frequency channels from which receive beams are mapped to which frequency channels of which transmit beams.

The satellite may simultaneously transmit to multiple terrestrial devices so that the signals transmitted by the satellite, also referred to as transmit signals, may constructively or destructively interfere. Accordingly, the satellite may include antenna elements positioned in different locations and orientations on the satellite such that the transmit signals constructively and destructively interfere to form the transmit beams corresponding to the terrestrial devices. For example, a transmit signal from an antenna element oriented at Los Angeles may be more strongly sensed by a terrestrial device in Los Angeles than a transmit signal from an antenna element oriented at Washington, DC. The transmit signals may be calculated so that even though the satellite transmits the same transmit signals, the transmit signals constructively or destructively interfere so that different terrestrial devices located within different transmit beam coverage areas sense different signals intended for the terrestrial devices.

To calculate the transmit signals, the satellite may perform a process similar to the inverse of the process used to form the receive beams from the receive signals. Specifically, the satellite may calculate the transmit signals by linearly combining the transmit beams using transmit beamforming coefficients. The transform beamforming coefficients may represent different weights that are applied to different transmit beams to obtain different transmit signals. For example, the transmit beamforming coefficients may specify for each pair of transmit beam and transmit signal, a multiplier that is applied to the transmit beam to obtain the transmit signal. A particular transmit signal may be calculated by summing the products of the transmit beams and the transmit beamforming coefficients for that transmit signal and the transmit beams.

For example, in a satellite using only two transmit beams, the transmit beamforming coefficients may specify that a first transmit signal to be transmitted by a first antenna element is calculated by multiplying a first transmit beam by 0.2 and adding the result to a second transmit beam multiplied by 0.85, and a second transmit signal to be transmitted by a second antenna element is calculated by multiplying the first transmit beam by 0.4 and adding the result to the second transmit beam multiplied by 0.7.

However, processing for obtaining transmit signals from receive signals as described above may be computationally intensive for the satellite. For example, the process involves three separate linear combinations: (i) a first combination to form the receive beams from receive signals, (ii) a second combination to switch the receive beams to transmit beams, and (iii) a third combination to calculate transmit signals from the transmit beams. Additionally, the amount of information needed for the various beamforming coefficients and the connection matrix may be large.

The process of obtaining transmit signals from receive signals may be improved by using a single linear combination to calculate transmit signals from obtained receive signals. The single linear combination may be based on linearly combining the receive signals using a transform table to obtain the transmit signals. The transform table may be calculated from the receive beamforming coefficients, the connection matrix (which defines the switching between the receive and the transmit beams), and the transmit beamforming coefficients, as described in greater detail below.

Figure 1:
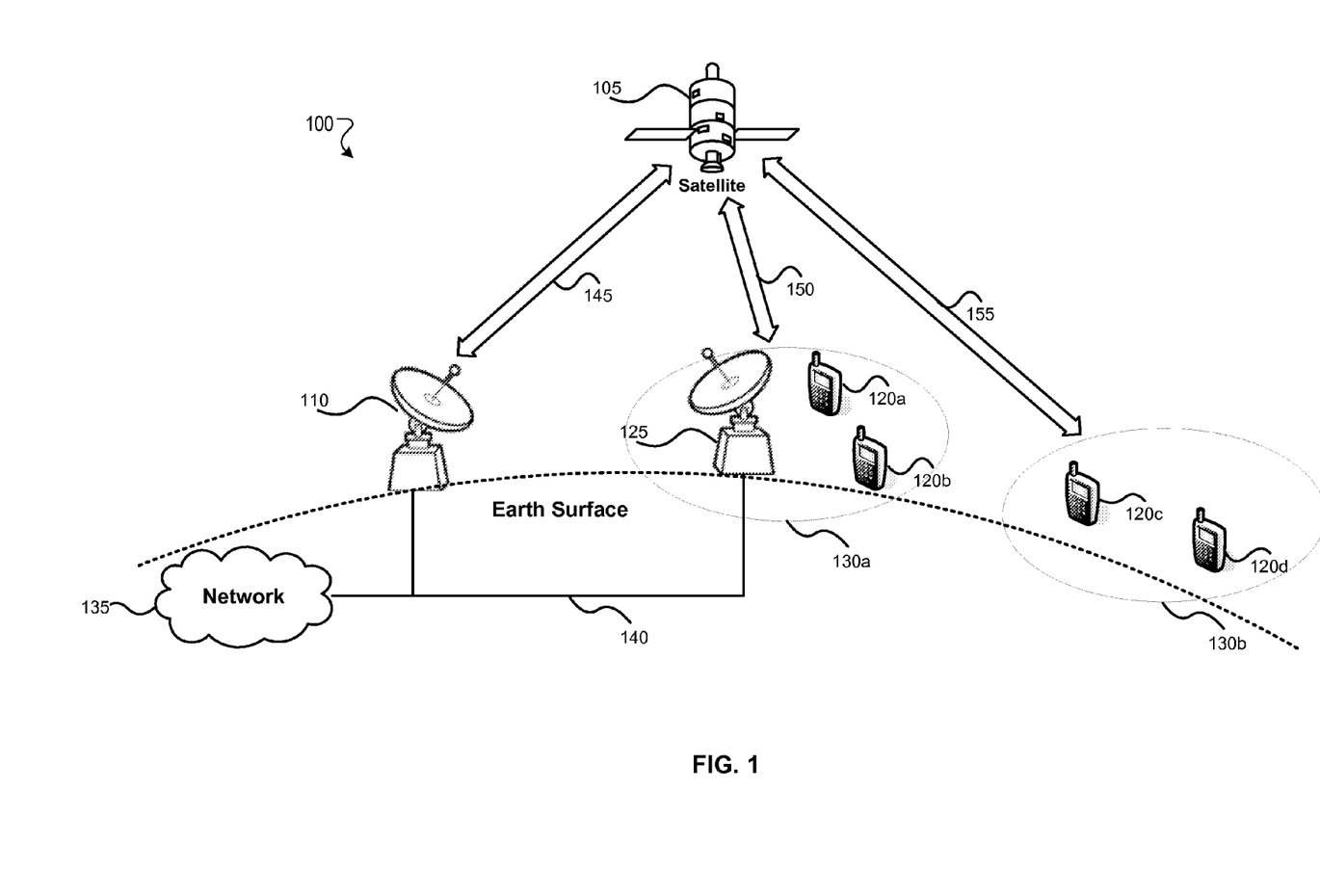
FIG. 1 illustrates an example satellite system that is used for beamforming.

FIG. 1 illustrates an exemplary satellite system 100 that is used for beamforming. The satellite system 100 includes a satellite 105 connected through satellite channels to gateways 110 and 125, and user terminals 120a, 120b, 120c and 120d, which are located on the surface of the Earth. The satellite 105 transmits data to and receives data from the gateways 110, 125, and user terminals 120a, 120b, 120c and 120d. Gateway 125 and user terminals 120a and 120b are within formed beam coverage area 130a. User terminals 120c and 120d are within formed beam coverage area 130b. That is, gateway 125 and user terminals 120a-120b are located within the geographic extent covered by beam 130a, while user terminals 120c-120d are located within the geographic extent covered by beam 130b. The gateways 110 and 125 are terrestrially connected to each other and to a terrestrial network 135 through communications link 140.

The satellite 105 may be located at a geostationary orbital location defined by a longitude. Alternatively, the satellite 105 may be located at a different orbital location, for example, a medium earth orbit or a low earth orbit. While only a single satellite 105 is shown, a plurality of satellites may be used. The satellite 105 interconnects the gateway 110, the gateway 125 and the user terminals 120a, 120b in beam 130a, and the user terminals 120c, 120d in beam 130b, through satellite communications channels. While only two gateways 110 and 125 are shown, a plurality of gateways may be employed. Similarly, more than two beams may be employed, and any number of user terminals may be used distributed amongst a plurality of beam coverage areas. A beam may include one or more gateways (e.g., beam 130a), or a beam may include zero gateways (e.g., 130b). A beam may be a receive beam when used by the satellite to receive signals and a transmit beam when used by the satellite to transmit signals.

The satellite 105 may include multiple antenna elements or feeds to enable transmission of information in both directions from the satellite 105 to the gateways or user terminals. The feeds transmit signals to or receive signals from the gateways 110, 125 and the user terminals 120a-120d.

A subset of the antenna elements or feeds in the satellite 105 may be used for transmission in the forward direction from the satellite 105 to the gateways 110 and 125, and the user terminals 120a-120d. These elements are referred to as the forward link elements, transmit elements, or forward link feeds. The remaining elements may be used for transmission in the return direction from the gateways 110, 125 and the user terminals 120a-120d to the satellite 105. These elements are referred to as the return link elements, return link feeds, receive elements, or receiving feeds.

The gateways 110 and 125 are coupled to the network 135 through a communications link 140. The network 135 may be a non-public data network, a public data network or a combination of public and non-public data networks, e.g., the Internet. The communications link 140 may be a high-speed terrestrial connection, such as an optical connection with data rates in the range of gigabits per second. In an alternative implementation, the communications link 140 also may be a satellite communications channel through a satellite that is different from the satellite 105. The communications link 140 may be part of a closed network accessible only to components of the satellite communications system 100, or may be part of an open network that connects the gateway 110 to the network 135.

The user terminals 120a-120d are computing devices able to communicate data to and from the satellite 105 over a satellite link. For example, the user terminals 120a-120d may be handheld mobile telephones or car phones, laptop personal computers, desktop personal computers, and/or geographically fixed phone booths. The user terminals in separate satellite coverage areas serviced by different formed beams communicate with each other and with the gateways 110 and 125 over the satellite 105 via the satellite links 145, 150 and 155. Each satellite link 145, 150 or 155 includes both an uplink to the satellite 105 and a downlink from the satellite 105.

Figure 2:
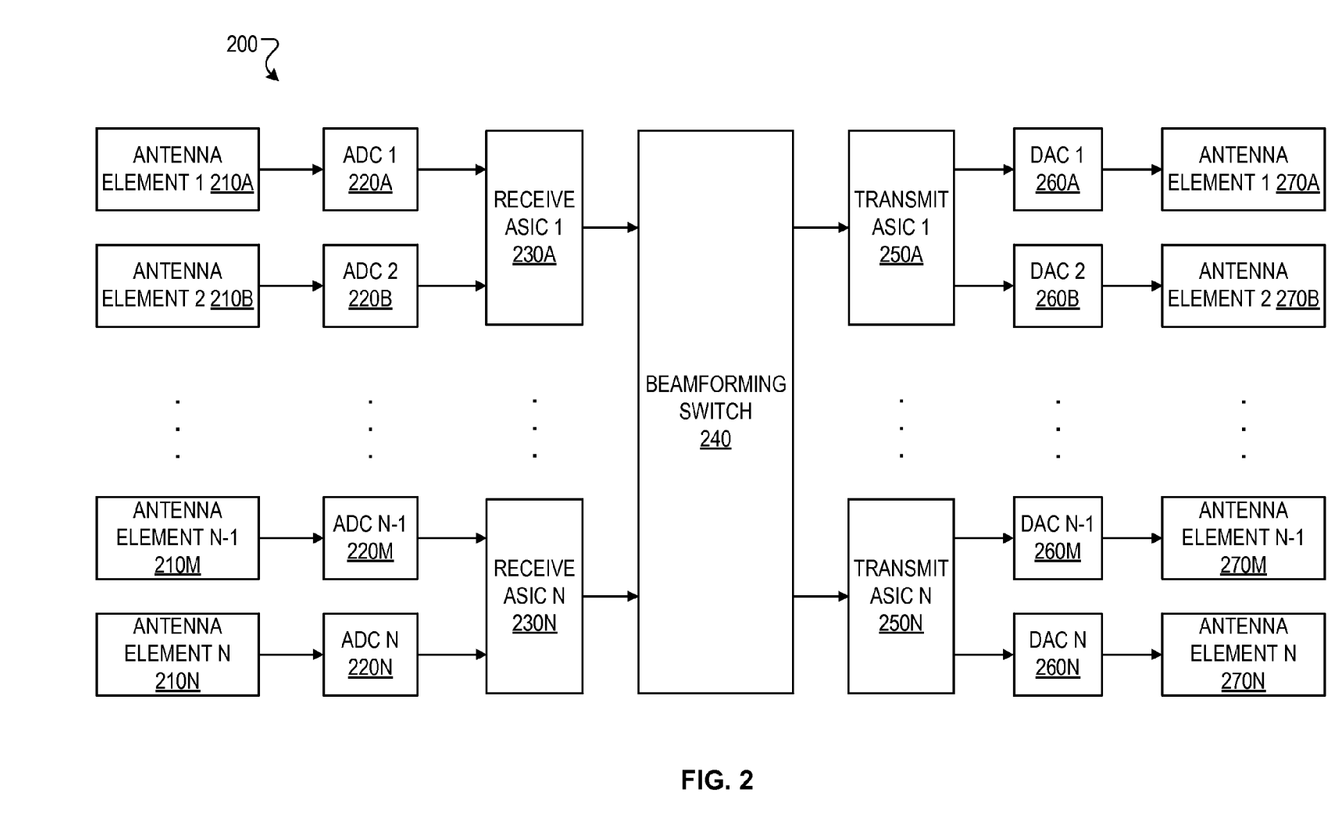
FIG. 2 shows an architecture of an example satellite used for beamforming.

FIG. 2 shows an architecture 200 of an example satellite 105 used for beamforming. The architecture 200 includes receive antenna elements 210A-N that sense analog terrestrial device signals and generate corresponding analog receive signals. The receive antenna elements 210A-N may be positioned in different locations on the satellite 105 and/or at different orientations so that the antenna elements 210A-N preferentially sense different analog terrestrial device signals. For example, antenna element 210A oriented at Los Angeles may sense signals from Los Angeles more strongly than antenna element 210B oriented at Washington, DC or antenna element 210N oriented at Los Angeles but a few inches further from Los Angeles.

Each receive antenna element 210A-N may be associated with a different gain radiation pattern (which may be embodied in, for example, a contour map) and a different phase radiation pattern (which also may be embodied in, for example, a contour map) that indicate that antenna element's preferential sensing of signals from Earth in view of its position and orientation. For example, a gain radiation pattern of an antenna element oriented at Los Angeles exhibits higher gain values in the Los Angeles area than in surrounding areas. These gain radiation patterns and the phase radiation patterns may be used to determine the receive beam coefficients.

The architecture 200 includes analog to digital converters (ADC) 220A-N. The ADCs 220A-N receive the analog receive signals produced by the antenna elements 210A-N and convert the analog receive signals to corresponding digital receive signals. In some implementations, each ADC 220A-N converts an analog receive signal produced by a corresponding antenna element 210A-N into a digital receive signal. For example, ADC 220A may obtain an analog receive signal produced by antenna element 210A and may sample the analog receive signal over time to produce a series of sequential digital numbers that represent the amplitude of the analog receive signal over time. The ADCs 220A-N also may be configured to additionally perform filtering and noise reduction of the receive signals.

The architecture 200 includes receive application-specific integrated circuits (ASICs) 230A-N. The digital receive signals output from the ADCs 220A-N may cover the entire bandwidth used by the system 100 for communication. For example, when the entire bandwidth used by the system 100 for communication is 480 MHz, the digital receive signals may use the full 480 MHz bandwidth. The receive ASICs 230A-N may each receive one or more wideband digital receive signals from the ADCs 220A-N and may split the wideband digital receive signals into subchannels, which also may be referred to as frequency channels. In the above example, the bandwidth may be channelized into 192 subchannels, each having 2.5 MHz of the bandwidth. For instance, the receive ASIC 230A may obtain a wideband digital receive signal from ADC 220A that uses the entire 480 MHz bandwidth and may obtain a wideband digital receive signal from ADC 220B that also uses the entire 480 MHz bandwidth. The ASIC 230A may split the wideband digital receive signal from ADC 220A into 192 different narrowband digital receive signals, each corresponding to a different 2.5 MHz channel. Similarly, the ASIC 230A also may split the wideband digital receive signal from ADC 220B into 192 different narrowband digital receive signals, each corresponding to a different 2.5 MHz channel.

The architecture 200 includes a beamforming switch 240. The beamforming switch 240 may determine narrowband digital transmit signals based on the narrowband digital receive signals produced by the receive ASICs 230A-N, which correspond to receive signals obtained by the satellite 105 at different frequency channels. Instead of determining the transmit signals from the receive signals as described above by (i) obtaining the receive signals, (ii) forming receive beams from the receive signals according to receive beamforming coefficients, (iii) forming transmit beams from the receive beams according to a connection matrix, and (iv) calculating the transmit signals from the transmit beams according to transmit beamforming coefficients, the beamforming switch 240 may use a single linear combination to calculate transmit signals from the obtained receive signals.

The single linear combination may be based on a transform table, also referred to as transform data, that is derived from the receive beamforming coefficients, the connection matrix, and the transmit beamforming coefficients. The transform table may include a coefficient for each combination of receive signal, receive frequency channel, transmit signal, and transmit frequency channel. The beamforming switch 240 may determine each transmit signal for each frequency channel by summing the products of all the receive signals at the frequency channel and the corresponding coefficients for that receive signal at the frequency channel in the transform table.

The transform table may be derived by, for each combination of receive signal, receive frequency channel, transmit signal, and transmit frequency channel, summing the products of the receive beamforming coefficients, connection matrix, and transmit beam coefficients for all combinations of receive beams and transmit beams. A mathematical example of calculating the transform table is described below with reference to FIG. 3.

The architecture 200 includes transmit ASICs 250A-N that are in communication with digital analog converters (DACs) 260A-N that are in communication with antenna elements 270A-N. The transmit ASICs 250A-N receive the narrowband, digital, channel-specific transmit signals calculated by the beamforming switch 240 and combine the narrowband channel-specific transmit signals into wideband digital signals, each of which typically covers the full bandwidth of the system. For example, the transmit ASIC 250A may receive a first set of 192 narrowband digital signals, each corresponding to transmit antenna element 270A and each corresponding to a different one of the 192 2.5 MHz channels. The ASIC 250A may combine the first set of 192 narrowband digital signals to generate a first wideband digital signal having a 480 MHz bandwidth that will then be provided to transmit antenna element 270A via DAC 260A. The transmit ASIC 250A also may receive a second set of 192 narrowband digital signals, each corresponding to transmit antenna element 270B and each corresponding to a different one of the 192 2.5 MHz channels. The ASIC 250A may combine the second set of 192 narrowband digital signals to generate a second wideband digital signal having a 480 MHz bandwidth that will then be provided to transmit antenna element 270B via DAC 260B.

The DACs 260A-N may receive the wideband digital signals from the transmit ASICs 250A-N and convert the wideband digital signals into wideband analog signals. Each DAC 260A-N may convert a wideband digital signal for a corresponding antenna element 270A-N. For example, DAC 260A may obtain a wideband digital signal from transmit ASIC 250A that includes a sequence of digital numbers over time that represent an amplitude for an analog signal to be transmitted by the antenna element 270A over time.

The antenna elements 270A-N transmit the transmit signals. The antenna elements 270A-N may be positioned in different locations and orientations on the satellite 105 so that signals transmitted by the antenna elements 270A-N coherently combine in a manner that results in the signals being stronger or weaker at different geographic locations on Earth. For example, an antenna element 270A oriented at Los Angeles may transmit signals that are stronger, and, hence, more easily sensed by terrestrial devices, at Los Angeles compared to transmit signals from antenna element 270B oriented at Washington, DC.

Each transmit antenna element 270A-N may be associated with a different gain radiation pattern (which may be embodied in, for example, a contour map) and a different phase radiation pattern (which also may be embodied in, for example, a contour map) that indicate the relative strength/gain and phase of signals transmitted by that antenna element at different locations on Earth in view of that antenna element's position and orientation. For example, a gain radiation pattern of an antenna element oriented at Los Angeles exhibits higher gain values in the Los Angeles area than in surrounding areas. The gain and phase radiation patterns may be used to determine the transmit beam coefficients.

In some implementations, the receive elements 210A-N and the transmit elements 270A-N are the same antenna elements. In these implementations, the antenna elements are capable of performing both receiving and transmitting functions.

Figure 3:
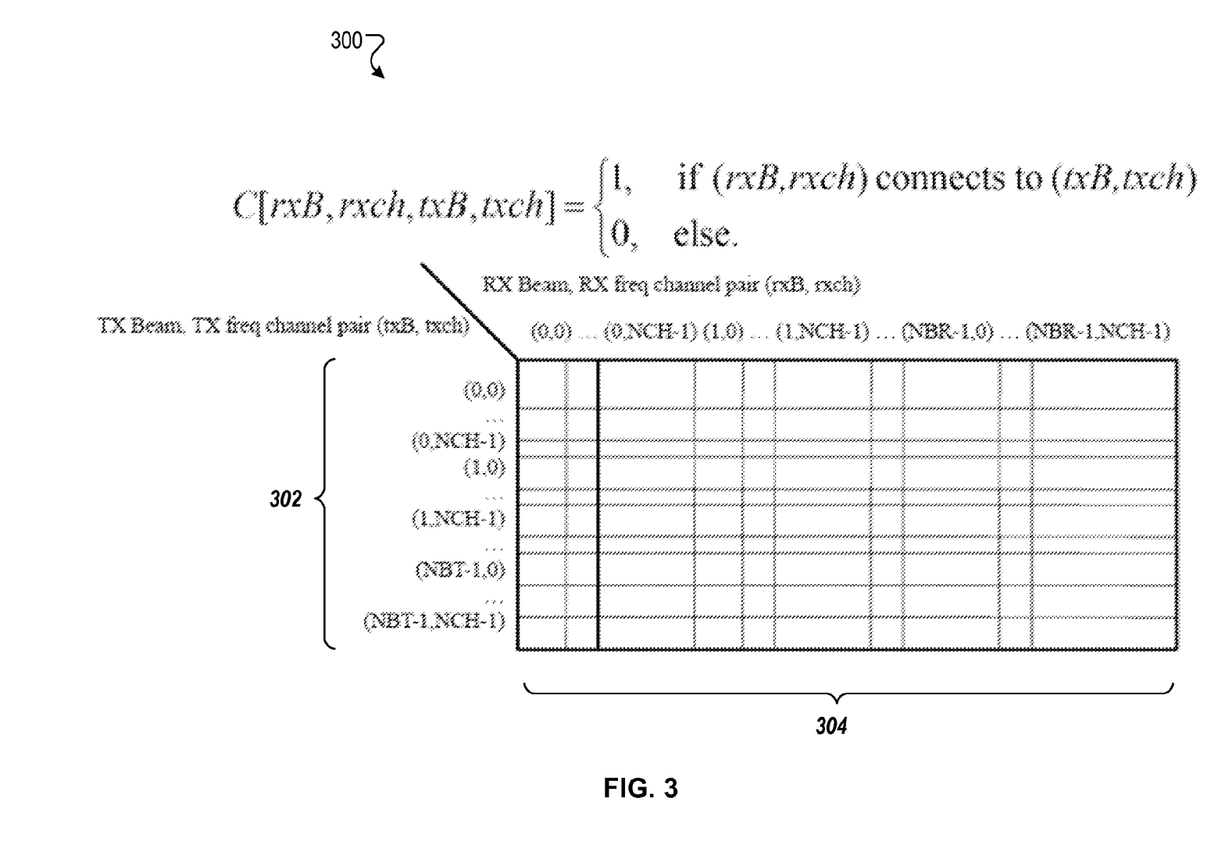
FIG. 3 illustrates a connection matrix used for beamforming.

FIG. 3 illustrates a connection matrix 300 used for beamforming. As mentioned above, the connection matrix 300 may be a matrix of "1"s and "0"s that identifies which frequencies from which receive beams will be mapped to which frequencies of which transmit beams.

As shown, the connection matrix 300 is a matrix C that depends on four parameters. Specifically, the rows 302 of the matrix 300 represent transmit beam index, txB, and transmit frequency channel index, txch, pairs, (txB, txch), and the columns 304 of the matrix 300 represent receive beam index, rxB, and receive frequency channel index, rxch, pairs, (rxB, rxch). The number of rows is equal to the number of different transmit beam and transmit frequency channel pairs, and the number of columns is equal to the number of different receive beam and receive frequency channel pairs. For example, if there are four transmit beams and three transmit frequency channels, the matrix will have twelve rows, one for each of the twelve different (txB, txch) pairs, and, if there are two receive beams and three receive frequency channels, the matrix will have six columns, one for each of the six different (rxB, rxch) pairs.

A value of "1" in a cell of the connection matrix represents that signals for the transmit beam and transmit frequency channel pair corresponding to the cell are switched from the receive beam and receive frequency channel pair corresponding to the cell. For example, the connection matrix may specify that a first frequency channel of a first receive beam is only switched to a third frequency channel of a second transmit beam by including a "1" in the cell that corresponds to a row for the second transmit beam and third transmit frequency channel pair and a column for the first receive beam and first receive frequency channel pair, and "0"s in all other cells in the row that corresponds to the second transmit beam and third transmit frequency channel pair and all other cells in the column that corresponds to the first receive beam and first receive frequency channel pair. Multiple "1" values for a given column may represent that the signal corresponding to the receive beam and receive frequency channel pair is broadcast to multiple transmit beam and transmit frequency channel pairs.

An equation-based example of how the connection matrix may be used to calculate transmit signals from receive signals is described below. The receive beamforming coefficients are represented as:

NBR=Number of receive (rx) beams
rxB=receive beam index [0, NBR−1]
NSR=Number of receive signals
rxS=receive signal index [0, NSR−1], and
br[rxB][rxS]=receive beamforming coefficient for receive beam rxB and receive signal rxS.

The transmit beamforming coefficients are represented as:
NBT=Number of transmit (tx) beams
txB=transmit beam index [0, NBT−1]
NST=Number transmit signals
txS=transmit signal index [0, NST−1]
bt[txB][txS]=beamforming coefficient for transmit beam txB and transmit signal txS.

The frequency channels are represented as:
NCH=Number of frequency channels
rxch=receive frequency channel index [0, NCH−1]
txch=transmit frequency channel index [0, NCH−1]

The receive signals and transmit signals are represented as:

x[rxS][rxch]=receive signal for receive signal rxS and frequency channel rxch y[txS][txch]=transmit signal for transmit signal txS and frequency channel txch As discussed above, a satellite may calculate transmit signals from receive signals using three separate linear combinations: (i) a first combination to form the receive beams from receive signals, (ii) a second combination to switch the receive beams to transmit beams, and (iii) a third combination to calculate transmit signals from the transmit beams. The three separate linear combinations are explained below using the equation-based example.

The receive beams may be represented as:

Br[rxB][rxch]=receive beam rxB at receive frequency channel rxch

The receive beams, Br[rxB][rxch], may be calculated from the receive signals, x[rxS][rxch], and the receive beamforming coefficients, br[rxB][rxS], using the equation:

$$Br[rxB][rxch] = \sum_{rxS} x[rxS][rxch]br[rxB][rxS] \quad \text{[Equation 1]}$$

Equation 1 specifies that a receive beam, Br, having a receive beam index, rxB, at a receive frequency channel, rxch, may be calculated by summing the products of the receive signal, x, at the receive frequency channel, rxch, and a receive beamforming coefficient, br, of the receive beam index, rxB, across all receive signals.

The transmit beams may be represented as:

Bt[txB][txch]=transmit beam txB at frequency channel txch

The transmit beams, Bt[txB][txch], may be calculated from the receive beams using the equation:

$$Bt[txB][txch] = \sum_{rxB}\sum_{rxch} Br[rxB][rxch]C[rxB, rxch, txB, txch] \quad \text{[Equation 2]}$$

Equation 2 specifies that a transmit beam, Bt, having a transmit beam index, txB, at a transmit frequency channel, txch, may be calculated by summing the product of the receive beams, Br, and a connection matrix at the transmit beam index, txB, and at the transmit frequency channel, txch, across all receive frequency channels and across all receive beams.

The transmit signals, y[txS][txch], may be calculated from the transmit beams, Bt[txB][txch], and the transmit beamforming coefficients, bt[txB][txS], using the equation:

$$y[txS][txch] = \sum_{txB} Bt[txB][txch]bt[txB][txS] \quad \text{[Equation 3]}$$

Equation 3 specifies that a transmit signal, y, having a transmit signal index, txS, at a transmit frequency channel, txch, may be calculated by summing the product of the transmit beams, Bt, at the transmit frequency channel, txch, and the transmit beam coefficients for the transmit signal index, txS, across all the transmit beams.

However, as stated previously, the above processing may be computationally intensive for the satellite because the processing involves three separate linear combinations, and the amount of information needed for the various beamforming coefficients and the connection matrix may be large. As noted previously, the size of the connection matrix is dependent on the number of receive beam and receive frequency channel pairs, and the number of transmit beam and transmit frequency channel pairs. The size of the connection matrix, therefore, can become quite large for many satellites. For example, if the satellite is configured to use 500 receive beams, 192 receive frequency channels, 500 transmit beams, and 192 transmit frequency channels, the connection matrix may include 500*192*500*192=9,216,000,000 cells. If each cell of the connection matrix is represented by a bit, the connection matrix may be 9,216,000,000 bits, i.e., a very large number.

The number of receive beamforming coefficients and transmit beamforming coefficients is also dependent on the number of receive beams and receive signals, and the number of transmit beams and transmit signals, respectively, and, therefore, also may become quite large for many satellites. For example, if the satellite is configured to use 500 receive beams and 60 receive signals, the receive beamforming coefficients may include 500*60=30,000 coefficients. And if the satellite is configured to use 400 transmit beams and 50 transmit signals, the transmit beamforming coefficients may include 400*50=20,000 coefficients. If each coefficient is represented by a 32-bit complex number, the receive beamforming coefficients may be 960,000 bits and the transmit beamforming coefficients may be 640,000 bits.

As shown by the above examples, a large amount of beamforming coefficient information and connection matrix information may have to both be stored and manipulated by a satellite to perform the three above-noted separate linear combinations (e.g., to compute Equations 1-3). Decreasing the amount of information and, hence, the satellite storage requirements and the computational intensity of the operations performed by the satellite may, therefore, be desirable.

The process of obtaining transmit signals from receive signals may be improved by using a single linear combination to calculate transmit signals from obtained receive signals. The single linear combination may be based on a transform table that is derived from the receive beamforming coefficients, the connection matrix, and the transmit beamforming coefficients, as described using the mathematical example below.

As shown above, the transmit signals, y[txS][txch], may be calculated from the transmit beams, Bt[txB][txch], and the transmit beamforming coefficients, bt[txB][txS], using Equation 3, re-shown below:

$$y[txS][txch] = \sum_{txB} Bt[txB][txch]bt[txB][txS] \quad \text{[Equation 3]}$$

The equation for calculating the transmit signals may be re-expressed by replacing the transmit beams, Bt[txB][txch], with Equation 2 used to obtain the transmit beams, as shown below:

$$y[txS][txch] = \sum_{txB}\sum_{rxB}\sum_{rxch} Br[rxB][rxch]C[rxB, rxch, rxB, txch]bt[txB][txS] \quad \text{[Equation 4]}$$

The equation may then be re-expressed by replacing the receive beams, Br[rxB][rxch], with Equation 1 used to obtain the receive beams, as shown below:

$$y[txS][txch] = \sum_{txB}\sum_{rxB}\sum_{rxch}\sum_{rxS} x[rxS][rxch]br[rxB][rxF]C[rxB, rxch, txB, txch]bt[txB][txS]$$ [Equation 5]

The equation may then be re-arranged by separating the summations across the different receive beams and transmit beams as shown below:

$$y[txF][txch] = \sum_{rxF}\sum_{rxch} x[rxF][rxch]\sum_{txB}\sum_{rxB} br[rxB][rxF]C[rxB, rxch, txB, txch]bt[txB][txF]$$ [Equation 6]

The equation may then be expressed by representing the summations across the different receive beams and transmit beams as a transform table, D, as shown below:

$$y[txS][txch] = \sum_{rxS}\sum_{rxch} x[rxS][rxch]D[rxS, rxch, txS, txch],$$ [Equation 7]

where $$D[rxS, rxch, txS, txch] = \sum_{txB}\sum_{rxB} br[rxB][rxS]C[rxB, rxch, txB, txch]bt[txB][txS]$$ [Equation 8]

As shown in Equation 8, the transform table, D, may be generated by summing the products of the receive beamforming coefficients, connection matrix, and transmit beamforming coefficients across all the receive beams and all the transmit beams. As shown in Equation 7, the transmit signals may be calculated by summing the products of the receive signals and the transform table across all receive frequency channels and receive signals.

When initially calculating the transform table the receive beamforming coefficients, connection matrix, and transmit beamforming coefficients may be needed. However, the transform table may be calculated in advance of calculating transmit signals from receive signals. For example, the transform table may be calculated by the satellite and used for all future calculations until the beamforming coefficients or connection matrix change. Therefore, once the satellite has obtained a transform table, the satellite may not need to use the beamforming coefficients or the connection matrix.

In another example, the transform table may be calculated on the ground and transmitted to the satellite. Providing the transform table to the satellite may not only reduce the processing needed by the satellite to calculate the transform table and to obtain transmit signals as described above, but may also reduce the amount of data needed to be transmitted to the satellite and stored by the satellite.

For example, the transform table may be smaller than the beamforming coefficients and connection matrix. If the satellite receives a transform table, the satellite may not need to receive any beamforming coefficients or a connection matrix as the satellite may not use the beamforming coefficients or the connection matrix. As described above, a connection matrix for a satellite configured to handle 500 receive beams, 192 receive frequency channels, 500 transmit beams, and 192 transmit frequency channels may be 9,216,000,000 bits.

However, as shown in the equation for calculating the transform table, the transform table is independent of the number of receive beams, Br, and the number of transmit beams, Bt. Instead, the size of the transform table is dependent on the number of receive signals, receive frequency channels, transmit signals, and transmit channels. For example, if the satellite is configured to handle 60 receive signals, 192 receive frequency channels, 60 transmit signals, and 192 transmit frequency channels, the transform table may include 60*192*60*192=132,710,400 values. If the values are represented by 32-bit complex numbers, the transform table may be 4,246,732,800 bits. Accordingly, the size of the transform table is almost half the size, 9,216,000,000 bits, of the connection matrix.

Notably, the reduction in bits that must be stored and processed by a satellite that performs a single linear operation to calculate the transmit signals directly from the receive signals relative to a typical satellite increases as the number of receive beams and the number of transmit beams increase. Specifically, for a typical satellite, the number of beamforming coefficients and the size of the connection matrix increase as the number of beams handled by the satellite increases, thereby increasing the computational requirements for performing each of the three different linear operations (corresponding, respectively, to each of the three separate operations of receive beamforming, switching, and transmit beamforming). In contrast, for a satellite that instead performs the above-noted single linear operation, the computational requirements to calculate the transmit signals directly from the receive signals using the transform table remains constant, irrespective of an increase in the number of beams, because the size of the transform table does not change with an increase in the number of beams. This result is particularly desirable because it removes the limit imposed by the limited storage and processing capabilities of the satellite on the number of beams that can be handled by the satellite.

Figure 4:
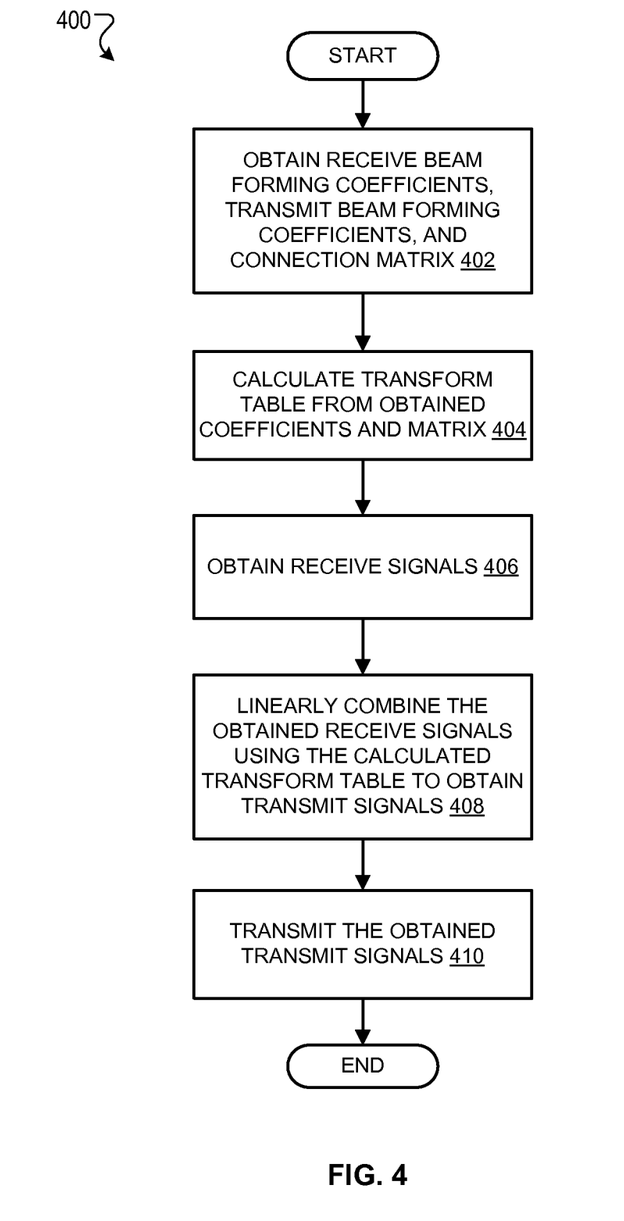
FIG. 4 is a flowchart illustrating an example of a process for beamforming.

FIG. 4 is a flowchart illustrating an example of a process 400 for beamforming. The process 400 may be performed by components of the satellite system 100. The process 400 is explained below as being performed by satellite 105. However, the process also may be performed in part by gateways 110 or 125, as described in FIG. 6. Additionally or alternatively, the process 400 may be performed by other components, systems, or system configurations.

The satellite 105 may obtain receive beamforming coefficients, transmit beamforming coefficients, and a connection matrix (402). For example, the receive beamforming coefficients may be br[rxB][rxS], the transmit beamforming coefficients may be bt[txB][txS], and the connection matrix may be C[rxB, rxch, txB, txch], as described above regarding FIG. 3. The satellite 105 may, for example, obtain the receive beamforming coefficients, the transmit beamforming coefficients, and the connection matrix from the gateway 110. For example, the gateway 110 may transmit the receive beamforming coefficients, the transmit beamforming coefficients, and the connection matrix to the satellite 105.

The satellite 105 may calculate a transform table from the obtained beamforming coefficients and connection matrix (404). For example, the transform table may be D[rxS,rxch, txS,txch], as described above regarding FIG. 3. The satellite 105 may, for example, generate the transform table according to Equation 8, by summing the products of the receive beamforming coefficients, connection matrix, and transmit beamforming coefficients across all the receive beams and all the transmit beams.

The satellite 105 may obtain receive signals (406). For example, the receive signals may be x[rxS][rxch], as described above regarding FIG. 3. The satellite 105 may obtain a receive signal corresponding to each of the satellite's 105 antenna elements 210A-N, where the receive signal corresponds to the signal sensed by the antenna elements 210A-N. For example, if the satellite includes 60 receive elements 210A-N and the signals received by the satellite are split into 192 frequency ranges each covering 2.5 MHz, the satellite 105 may obtain 60 receive signals, each split into 192 receive frequency channels.

The satellite 105 may linearly combine the obtained receive signals using the calculated transform table to obtain transmit signals (408). For example, the satellite 105 may linearly combine the obtained receive signals according to Equation 7, by summing the products of the receive signals and the transform table across all receive frequency channels and receive signals.

The satellite 105 may transmit the obtained transmit signals (410). For example, the satellite 105 may use the antenna elements 270A-N for transmitting by transmitting each obtained transmit signal using a corresponding one of the antenna elements 270A-N.

Figure 5:
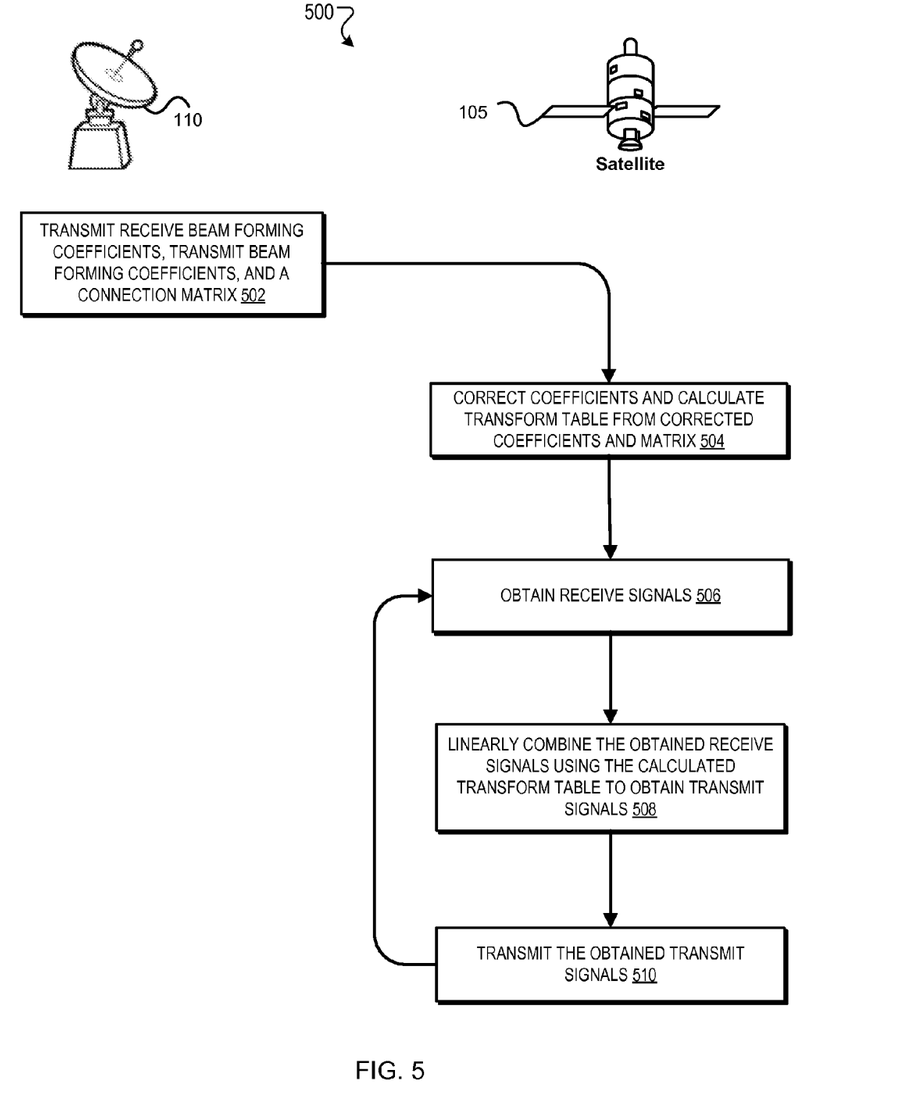
FIG. 5 is a flowchart illustrating an example of a process for beamforming using a transform table calculated by a satellite.

FIG. 5 is a flowchart illustrating an example of a process 500 for beamforming using a transform table calculated by a satellite. The process 500 may be performed by components of the satellite system 100. The process 500 is explained below as being performed by the satellite 105 and the gateway 110. Additionally or alternatively, the process 500 may be performed by other components, systems, or system configurations.

The gateway 110 may transmit receive beamforming coefficients, transmit beamforming coefficients, and a connection matrix to the satellite 105 (502). For example, the receive beamforming coefficients may be br[rxB][rxS], the transmit beamforming coefficients may be bt[txB][txS], and the connection matrix may be C[rxB, rxch, txB, txch], as described above with respect to FIG. 3.

The satellite 105 may correct the coefficients received from the gateway 110 and calculate a transform table from the corrected beamforming coefficients and connection matrix (504). The satellite 105 may correct the coefficients to account for calibration or pointing errors. For pointing errors, the satellite 105 may correct the coefficients to account for changes in the spacecraft's field of view. For calibration errors, the satellite 105 may correct coefficients to account for changes in the satellite's 105 antenna performance.

The transform table may be D[rxS,rxch,txS,txch], as described above with respect to FIG. 3. The satellite 105 may generate the transform table as described above with respect to operation (404) of FIG. 4.

The satellite 105 may obtain receive signals (506). For example, the receive signals may be x[rxS][rxch], as described above with respect to FIG. 3. The satellite 105 may obtain receive signals as described above with respect to operation (406) of FIG. 4.

The satellite 105 may linearly combine the obtained receive signals using the calculated transform table to obtain transmit signals (508). For example, the satellite 105 may linearly combine the obtained receive signals as described above with respect to operation (408) of FIG. 4.

The satellite 105 may transmit the obtained transmit signals (510). For example, the satellite 105 may transmit the obtained transmit signals as described above with respect to operation (410) of FIG. 4.

The satellite 105 may then repeat operations (506), (508), and (510) to obtain additional receive signals (506), linearly combine the obtained receive signals using the calculated transform table to obtain transmit signals (508), and transmit the obtained transmit signals (510), without recalculating the transform table. When the beamforming coefficients and/or the connection matrix changes, the satellite 105 may recalculate the transform table using the beamforming coefficients and connection matrix.

Notably, unlike the processing involved in calculating transmit signals from receive signals using the transform table, the processing involved in calculating a new transform table does increase as the number of beams handled by the satellite increases. However, the processing required to calculate a new transform table is much less computationally intensive than the processing required to perform the three different linear operations of typical satellites because it occurs infrequently, i.e., typically only when the satellite's beam plan changes (e.g., when the connection matrix and/or the beamforming coefficients change), and, moreover, because it occurs offline, i.e., while the communication signals handled by the satellite remain being processed using the old transform table.

Figure 6:
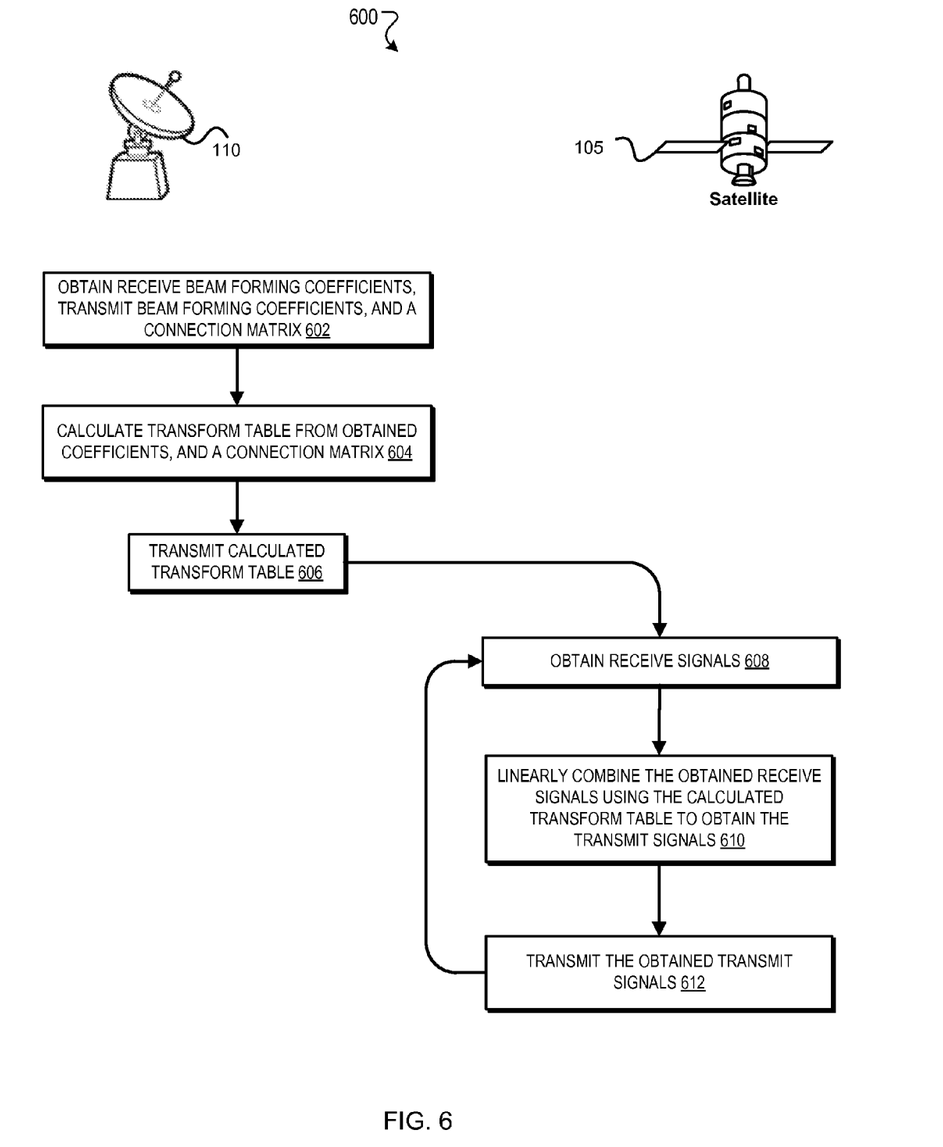
FIG. 6 is a flowchart illustrating an example of a process for beamforming using a transform table calculated by a gateway.

FIG. 6 is a flowchart illustrating an example of a process 600 for beamforming using a transform table calculated by a gateway. The process 600 may be performed by components of the satellite system 100. The process 600 is explained below as being performed by satellite 105 and gateway 110. Additionally or alternatively, the process 600 may be performed by other components, systems, or system configurations.

The gateway 110 may obtain receive beamforming coefficients, transmit beamforming coefficients, and a connection matrix (602). For example, the receive beamforming coefficients may be br[rxB][rxS], the transmit beamforming coefficients may be bt[txB][txS], and the connection matrix may be C[rxB, rxch, txB, txch], as described above regarding FIG. 3. The gateway 110 may obtain the beamforming coefficients and the transmit beamforming coefficients by correcting for calibration and pointing errors. Alternatively, the gateway 110 may receive the beamforming coefficients and the transmit beamforming coefficients that are already corrected.

The gateway 110 may calculate a transform table from the obtained beamforming coefficients and connection matrix (604). For example, the transform table may be D[rxS,rxch, txS,txch], as described above with respect to FIG. 3. The gateway 110 may generate the transform table as described above with respect to operation (404) of FIG. 4.

The gateway 110 may transmit the calculated transform table to the satellite 105 (606). For example, the gateway 110 may transmit D[rxS,rxch,txS,txch] to the satellite 105.

The satellite 105 may obtain receive signals (608). For example, the receive signals may be x[rxS][rxch], as described above with respect to FIG. 3. The satellite 105 may obtain receive signals as described above with respect to operation (406) of FIG. 4.

The satellite 105 may linearly combine the obtained receive signals using the transform table received from the gateway 110 to obtain transmit signals (610). For example, the satellite 105 may linearly combine the obtained receive signals as described above with respect to operation (408) of FIG. 4.

The satellite 105 may transmit the obtained transmit signals (612). For example, the satellite 105 may transmit the obtained transmit signals as described above with respect to operation (410) of FIG. 4.

The satellite 105 may then repeat steps (608), (610), and (612), to obtain additional receive signals (608), linearly combine the obtained receive signals using the received transform table to obtain transmit signals (610), and transmit the obtained transmit signals (612), without recalculating the transform table. When the beamforming coefficients and/or the connection matrix changes, the satellite 105 may recalculate the transform table using the beamforming coefficients and the connection matrix.

As noted previously, the processing involved in recalculating the transform table does increase as the number of beams handled by the satellite increases. However, in contrast to the process 500, the process 600 performs this processing on Earth and, therefore, completely eliminates any constraints on the number of beams due to the limited storage and processing capabilities of the satellite 105.

Although transform data is described above in the form of a table, the transform data may also be in other formats. For example, the transform data may be represented by a function that has an output based on inputs of a receive signal index, a receive frequency channel index, a transmit signal index, and a transmit frequency channel index.

Similarly, although the connection matrix is described above as a matrix, the connection data represented by the connection matrix may also be represented in other formats. For example, the connection data may be represented by a function that has an output based on inputs of a receive beam index, a receive frequency channel index, a transmit beam index, and a transmit frequency channel index.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A method for beamforming in a satellite communications network, the method comprising:
  obtaining, by a satellite, receive beamforming coefficients representing weights that are applied to receive signals to obtain receive beams;

obtaining, by the satellite, connection data defining which receive frequency channels from which receive beams are mapped to which transmit frequency channels of which transmit beams;

obtaining, by the satellite, transmit beamforming coefficients representing weights that are applied to transmit beams to obtain transmit signals;

calculating, by the satellite, transform data based at least on the receive beamforming coefficients, a connection matrix, and the transmit beamforming coefficients across all the receive beams and all the transmit beams;

obtaining, by the satellite, receive signals using corresponding receive elements, the receive signals forming one or more receive beams at one or more receive frequency channels;

calculating, by the satellite, transmit signals by a single linear combination of the obtained receive signals according to the transform data, the calculated transmit signals forming one or more transmit beams at one or more transmit frequency channels without forming receive beams from the receive signals; and transmitting, by the satellite, the calculated transmit signals using corresponding transmit elements.

2. The method of claim 1, wherein the transform data defines weights by a receive signal, a receive frequency channel, a transmit signal, and a transmit frequency channel.

3. The method of claim 1, wherein calculating transmit signals comprises summing products of the receive signals and the transform data across all the receive frequency channels and the receive signals.

4. The method of claim 1, wherein calculating, by the satellite, transform data based at least one the receive beamforming coefficients, the connection matrix, and the transmit beamforming coefficients across all the receive beams and all the transmit beams
comprises:
calculating the transform data by summing a product of the receive beamforming coefficients, the connection matrix, and the transmit beamforming coefficients across all the receive beams and all the transmit beams.

5. The method of claim 1, further comprising:
obtaining, by the satellite, a second set of receive signals using the corresponding receive elements, the second set of receive signals forming the one or more receive beams at the one or more receive frequency channels;
calculating, by the satellite, a second set of transmit signals by linearly combining the obtained second set of receive signals using the transform data, the calculated second set of transmit signals forming the one or more transmit beams at the one or more transmit frequency channels; and
transmitting, by the satellite, the calculated second set of transmit signals using the corresponding transmit elements.

6. A system for beamforming in a satellite communications network, the system comprising:
a processor;
one or more instructions encoded in a non-transitory computer-readable storage medium for execution by the processor, the one or more instructions when executed by the processor cause the processor to perform operations comprising:
obtaining, by a satellite, receive beamforming coefficients representing weights that are applied to receive signals to obtain receive beams;

obtaining, by the satellite, connection data defining which receive frequency channels from which receive beams are mapped to which transmit frequency channels of which transmit beams;

obtaining, by the satellite, transmit beamforming coefficients representing weights that are applied to transmit beams to obtain transmit signals;

calculating, by the satellite, transform data based at least on the receive beamforming coefficients, a connection matrix, and the transmit beamforming coefficients across all the receive beams and all the transmit beams;

obtaining, by the satellite, receive signals using corresponding receive elements, the receive signals forming one or more receive beams at one or more receive frequency channels;

calculating, by the satellite, transmit signals by a single linear combination of the obtained receive signals according to the transform data, the calculated transmit signals forming one or more transmit beams at one or more transmit frequency channels without forming receive beams from the receive signals; and transmitting, by the satellite, the calculated transmit signals using corresponding transmit elements.

7. The system of claim 6, wherein the transform data defines weights by a receive signal, a receive frequency channel, a transmit signal, and a transmit frequency channel.

8. The system of claim 6, wherein calculating transmit signals comprises summing products of the receive signals and the transform data across all the receive frequency channels and the receive signals.

9. The system of claim 6, wherein calculating, by the satellite, transform data based at least one the receive beamforming coefficients, the connection matrix, and the transmit beamforming coefficients across all the receive beams and all the transmit beams comprises:
calculating the transform data by summing a product of the receive beamforming coefficients, the connection matrix, and the transmit beamforming coefficients across all the receive beams and all the transmit beams.

10. The system of claim 6, the operations further comprising:
obtaining, by the satellite, a second set of receive signals using the corresponding receive elements, the second set of receive signals forming the one or more receive beams at the one or more receive frequency channels;
calculating, by the satellite, a second set of transmit signals by linearly combining the obtained second set of receive signals using the transform data, the calculated second set of transmit signals forming the one or more transmit beams at the one or more transmit frequency channels; and
transmitting, by the satellite, the calculated second set of transmit signals using the corresponding transmit elements.

11. A computer program product, embodied in a non-transitory computer-readable medium and including instructions executable by a processor, the instructions when executed configured to cause the processor to perform operations comprising:
obtaining, by a satellite, receive beamforming coefficients representing weights that are applied to receive signals to obtain receive beams;

obtaining, by the satellite, connection data defining which receive frequency channels from which receive beams are mapped to which transmit frequency channels of which transmit beams;

obtaining, by the satellite, transmit beamforming coefficients representing weights that are applied to transmit beams to obtain transmit signals;

calculating, by the satellite, transform data based at least on the receive beamforming coefficients, a connection matrix, and the transmit beamforming coefficients across all the receive beams and all the transmit beams;

obtaining, by the satellite, receive signals using corresponding receive elements, the receive signals forming one or more receive beams at one or more receive frequency channels;

calculating, by the satellite, transmit signals by a single linear combination of the obtained receive signals according to the using transform data, the calculated transmit signals forming one or more transmit beams at one or more transmit frequency channels without forming receive beams from the receive signals; and transmitting, by the satellite, the calculated transmit signals using corresponding transmit elements.

12. The computer program product of claim 11, wherein the transform data defines weights by a receive signal, a receive frequency channel, a transmit signal, and a transmit frequency channel.

13. The computer program product of claim 11, wherein calculating transmit signals comprises summing products of the receive signals and the transform data across all the receive frequency channels and the receive signals.

14. The computer program product of claim 11, wherein calculating, by the satellite, transform data based at least one the receive beamforming coefficients, the connection matrix, and the transmit beamforming coefficients across all the receive beams and all the transmit beams comprises:

calculating the transform data by summing a product of the receive beamforming coefficients, the connection matrix, and the transmit beamforming coefficients across all the receive beams and all the transmit beams.

15. The computer program product of claim 11, the operations further comprising:

obtaining, by the satellite, a second set of receive signals using the corresponding receive elements, the second set of receive signals forming the one or more receive beams at the one or more receive frequency channels;

calculating, by the satellite, a second set of transmit signals by linearly combining the obtained second set of receive signals using the transform data, the calculated second set of transmit signals forming the one or more transmit beams at the one or more transmit frequency channels; and transmitting, by the satellite, the calculated second set of transmit signals using the corresponding transmit elements.

\* \* \* \* \*